(12) United States Patent
Kinoshita

(10) Patent No.: US 7,098,926 B2
(45) Date of Patent: Aug. 29, 2006

(54) TRAPPING AREA CREATING METHOD, TRAPPING AREA CREATING APPARATUS, AND TRAPPING AREA CREATING PROGRAM STORAGE MEDIUM

(75) Inventor: Yoshiaki Kinoshita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 101 days.

(21) Appl. No.: 10/000,065

(22) Filed: Dec. 4, 2001

(65) Prior Publication Data
US 2002/0167526 A1 Nov. 14, 2002

(30) Foreign Application Priority Data
Jan. 17, 2001 (JP) .............................. 2001-009024

(51) Int. Cl.
G06F 15/00 (2006.01)
G06T 7/00 (2006.01)
B41M 1/14 (2006.01)
H04N 1/46 (2006.01)

(52) U.S. Cl. .................. 345/589; 345/443; 345/581; 358/1.1; 382/171; 382/173

(58) Field of Classification Search .............. 345/589, 345/593, 597, 618, 16, 22, 443, 467.1, 418–421, 345/441, 428, 581; 358/1.1, 1.9, 2.1, 515, 358/518, 530, 1.15, 1.17, 538, 558; 382/162–167, 382/171, 173
See application file for complete search history.

(56) References Cited

U.S. PATENT DOCUMENTS

| 5,113,249 | A | | 5/1992 | Yosefi | 358/75 |
| 5,313,570 | A | * | 5/1994 | Dermer et al. | 345/589 |
| 5,611,000 | A | * | 3/1997 | Szeliski et al. | 382/294 |
| 5,613,046 | A | | 3/1997 | Dermer | 395/109 |
| 5,668,931 | A | * | 9/1997 | Dermer | 358/1.4 |
| 6,031,544 | A | | 2/2000 | Yhann | 345/434 |
| 6,246,283 | B1 | * | 6/2001 | Ahuja et al. | 330/109 |
| 6,246,804 | B1 | * | 6/2001 | Sato et al. | 382/284 |
| 6,252,608 | B1 | * | 6/2001 | Snyder et al. | 345/473 |
| 6,466,299 | B1 | * | 10/2002 | Lehtiniemi et al. | 349/199 |
| 2001/0019340 | A1 | * | 9/2001 | Kubo et al. | 347/1 |
| 2001/0055130 | A1 | * | 12/2001 | Geurts et al. | 358/530 |

* cited by examiner

*Primary Examiner*—Wesner Sajous
(74) *Attorney, Agent, or Firm*—Sughrue Mion, PLLC

(57) ABSTRACT

A trapping area creating method in which an image represented in form of a combination of polygons is divided into a plurality of image areas by a straight line passing through vertexes of the polygons. The propriety of trapping is decided for each pair of image areas adjacent to one another in at least one direction of two predetermined directions, with respect to the plurality of image areas wherein the image is divided. A band-shaped trapping area extending along a boundary of two image areas constituting a pair of image areas decided as being suitable for a trapping is created.

7 Claims, 18 Drawing Sheets

TRAPPING AREA CREATING METHOD, TRAPPING AREA CREATING APPARATUS, AND TRAPPING AREA CREATING PROGRAM STORAGE MEDIUM

BACKGROUND OF THE INVENTION

1. Field of the Invention

The present invention relates to a trapping area creating method of creating a band-shaped trapping area extending along the color identification boundary of an image, a trapping area creating apparatus for creating a trapping area, a trapping area creating program for causing a computer to execute the trapping area creating method when the trapping area creating program is incorporated into the computer, and a trapping area creating program storage medium storing the trapping area creating program.

2. Description of the Related Art

Generally, there is known a method of creating an image by a multicolored printing using a plurality of machine plates associated with a plurality of primary colors. In the event that on an image created by such a multicolored printing there is a color identification boundary in which colors near two primary colors are close to one another, it often brings about a blank space on the color identification boundary owing to misregistration among a plurality of machine plates. In view of the foregoing, hitherto, there is performed a trapping of compensating for misregistration between machine plates by means of edging one or both of two color areas contacting with each other at a color identification boundary in which colors near two primary colors are close to one another, at a band-shaped trapping area along the color identification boundary.

Recently, as a computer technology advances, it often happens that editing of an image created by a multicolored printing is performed on a computer. In this case, it is troublesome for editors to severally create the trapping area. Accordingly, there is desired a trapping area creating program for automatically creating a trapping area from image data.

As a method of creating trapping area by such a trapping area creating program, there is proposed, for example, a creating method in which an image is divided into a large number of small areas as a lattice, existence as to a color identification boundary is decided for each small area, and the small areas associated with the color identification boundary are coupled with one another to create a band-shaped trapping area.

In order to create a band-shaped trapping area, it is necessary that an image be divided into a sufficiently large number of small areas. However, dividing the image into so large number of small areas causes an amount of computation to be enormous. This involves a problem that a creation of the trapping area is slow down.

SUMMARY OF THE INVENTION

In view of the foregoing, it is an object of the present invention to provide a trapping area creating method capable of creating a trapping area at high speed, a trapping area creating apparatus for creating a trapping area at high speed in accordance with such a trapping area creating method, a trapping area creating program for causing a computer to execute the trapping area creating method when the trapping area creating program is incorporated into the computer, and a trapping area creating program storage medium storing the trapping area creating program.

To achieve the above-mentioned object, the present invention provides a trapping area creating method comprising:

a division step of dividing an image represented in form of a combination of polygons to which colors are applied, into a plurality of image areas by a straight line passing through vertexes of the polygons;

a decision step of deciding a propriety of trapping for each pair of image areas adjacent to one another in at least one direction of predetermined two directions, with respect to the plurality of image areas wherein the image is divided; and a trapping area creating step of creating a band-shaped trapping area extending along a boundary of two image areas constituting a pair of image areas decided as being suitable for a trapping in said decision step.

It is acceptable that the trapping area creating method according to the present invention includes, as an occasion arises, other than said division step, a step of dividing the image by a straight line passing through an intersection of the sides constituting the polygon.

According to the trapping area creating method of the present invention, it is possible to create a trapping area even if the number of divisions for the image in the division step is kept on not many. Accordingly it is possible to create the trapping area at high speed with a computer and the like.

In the trapping area creating method according to the present invention as mentioned above, it is preferable that said division step divides the image using, as said straight line, straight lines extending in same directions as said predetermined two directions passing through the vertexes of the polygon, and sides of the polygon.

Here, it is acceptable that the division step is one in which all the sides and the straight lines as mentioned above are used unconditionally or alternatively another one in which those elements are optionally selected.

According to the preferable trapping area creating method as mentioned above, a direction of the straight line used for a division of the image is contrived. Thus, it is possible to reduce the number of times of deciding propriety of trapping. As a result, it is possible to create the trapping area at high speed.

In the trapping area creating method according to the present invention as mentioned above, it is an aspect that said decision step typically adopts, as said predetermined two directions, an upper and lower direction and a right and left direction of the image.

In the trapping area creating method according to the present invention as mentioned above, it is preferable that said decision step decides the propriety of trapping in accordance with a difference between colors of two image areas constituting said pair of image areas. Decision of the propriety of trapping can be performed readily and at high speed.

Further, in the trapping area creating method according to the present invention as mentioned above, it is preferable that said trapping area creating step creates, as said trapping area, an area interposed between a line constituting said boundary and a line obtained when said line (first occurring) is subjected to a parallel translation. Such an area can be created readily and at high speed.

To achieve the above-mentioned object, the present invention provides a trapping area creating apparatus creating a trapping area in accordance with a trapping area creating method comprising:

a division step of dividing an image represented in form of a combination of polygons to which colors are applied, into a plurality of image areas by a straight line passing through vertexes of the polygons;

a decision step of deciding a propriety of trapping for each pair of image areas adjacent to one another in at least one direction of predetermined two directions, with respect to the plurality of image areas wherein the image is divided; and a trapping area creating step of creating a band-shaped trapping area extending along a boundary of two image areas constituting a pair of image areas decided as being suitable for a trapping in said decision step.

To achieve the above-mentioned object, the present invention provides a trapping area creating program, which causes a computer to execute a trapping area creating method comprising:

a division step of dividing an image represented in form of a combination of polygons to which colors are applied, into a plurality of image areas by a straight line passing through vertexes of the polygons;

a decision step of deciding a propriety of trapping for each pair of image areas adjacent to one another in at least one direction of predetermined two directions, with respect to the plurality of image areas wherein the image is divided; and a trapping area creating step of creating a band-shaped trapping area extending along a boundary of two image areas constituting a pair of image areas decided as being suitable for a trapping in said decision step, when said trapping area creating program is incorporated into said computer.

To achieve the above-mentioned object, the present invention provides a trapping area creating program storage medium storing a trapping area creating program, which causes a computer to execute a trapping area creating method comprising:

a division step of dividing an image represented in form of a combination of polygons to which colors are applied, into a plurality of image areas by a straight line passing through vertexes of the polygons;

a decision step of deciding a propriety of trapping for each pair of image areas adjacent to one another in at least one direction of predetermined two directions, with respect to the plurality of image areas wherein the image is divided; and a trapping area creating step of creating a band-shaped trapping area extending along a boundary of two image areas constituting a pair of image areas decided as being suitable for a trapping in said decision step, when said trapping area creating program is incorporated into said computer.

Incidentally, with respect to the trapping area creating apparatus of the present invention and the trapping area creating program of the present invention, only the basic embodiments are shown. However, this is to do so in order to avoid the redundancy, and it is noted that the trapping area creating apparatus of the present invention and the trapping area creating program of the invention include not only the basic embodiments, but also a various types of embodiments of the trapping area creating apparatus and the trapping area creating program corresponding to the above-mentioned trapping area creating method.

DETAILED DESCRIPTION OF PREFERRED EMBODIMENTS

Embodiments of the present invention will be described with reference to the accompanying drawings.

In the following explanation, the following image data and the like are premised. That is, image data representative of an image is constructed in form of an assembly of component data, which are indicative of colored polygon. A figure constructed by a curve such as a circle is approximately expressed by a polygon. Hereinafter, it happens that a polygon represented by the component data is referred to as "component".

A plurality of polygons represented by a plurality of component data constituting the image data is involved in a relationship of the upper and lower sides. In a case where an "upper" of polygon is overlapped with a "lower" of polygon, an external form and a color of the "upper" of polygon take priority. The component data includes coordinates of the vertexes constituting a polygon.

This type of image data has been utilized in various fields.

Figure 1:
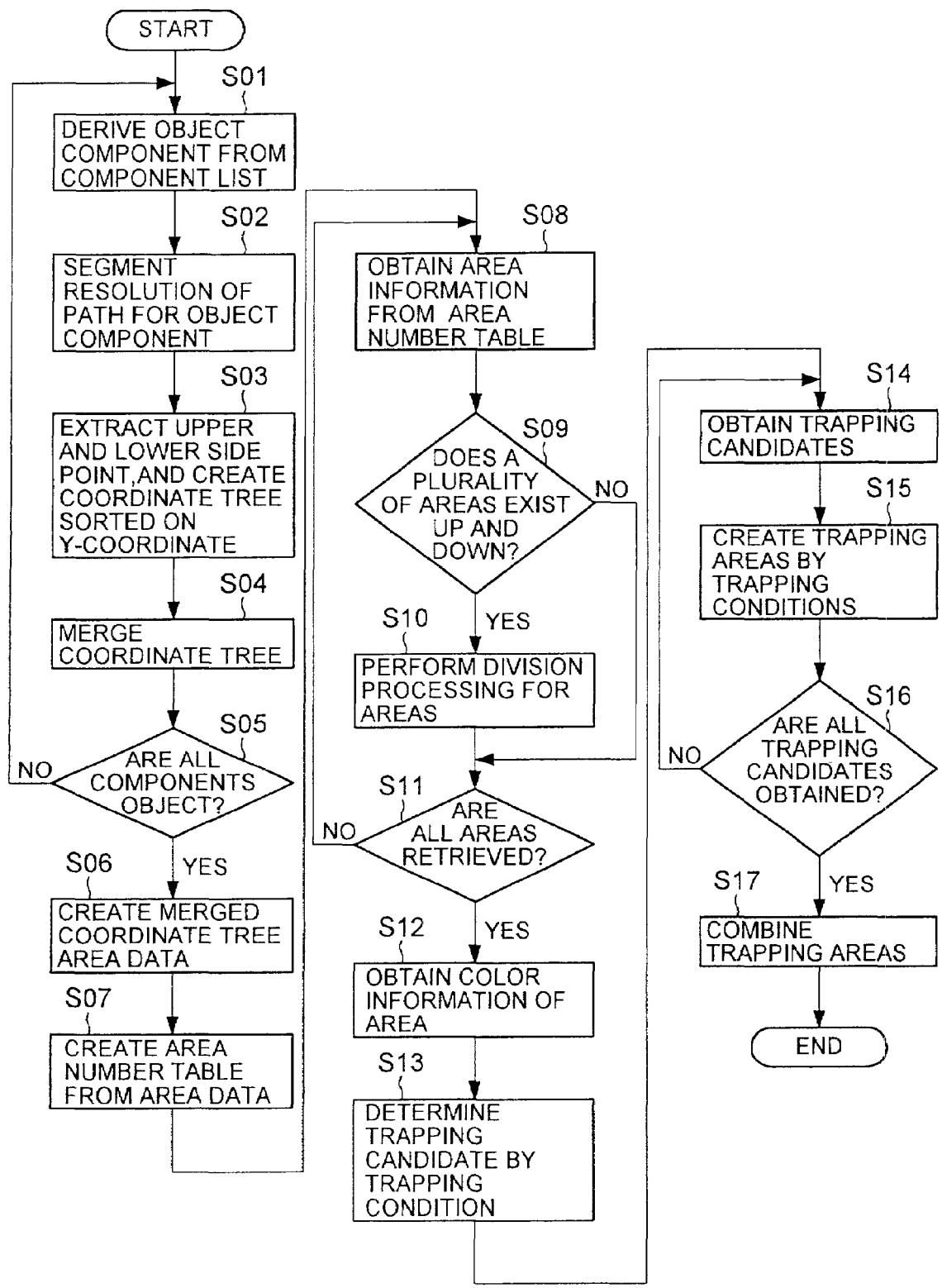
FIG. 1 is a flowchart useful for understanding a trapping area creating method according to an embodiment of the present invention.

FIG. 1 is a flowchart useful for understanding a trapping area creating method according to an embodiment of the present invention.

Of this flowchart, step 01 to step 11, which will be described later, constitute an example of a division step referred to in the present invention.

Further, of this flowchart, step 13, which will be described later, corresponds to an example of a decision step referred to in the present invention.

Furthermore, of this flowchart, step 14 to step 17, which will be described later, constitute an example of a trapping area creating step referred to in the present invention.

Hereinafter, this flowchart will be explained in conjunction with the accompanying drawings.

First, component data, which are objects for creation of coordinates trees as will be described latter, are derived one by one from an assembly of component data constituting image data (a step 01 in FIG. 1). Here, the component data are sequentially derived from the "lower" side in accordance with the above-mentioned relationship of the upper and lower sides, which is applied to the component data constituting image data.

Figure 2:
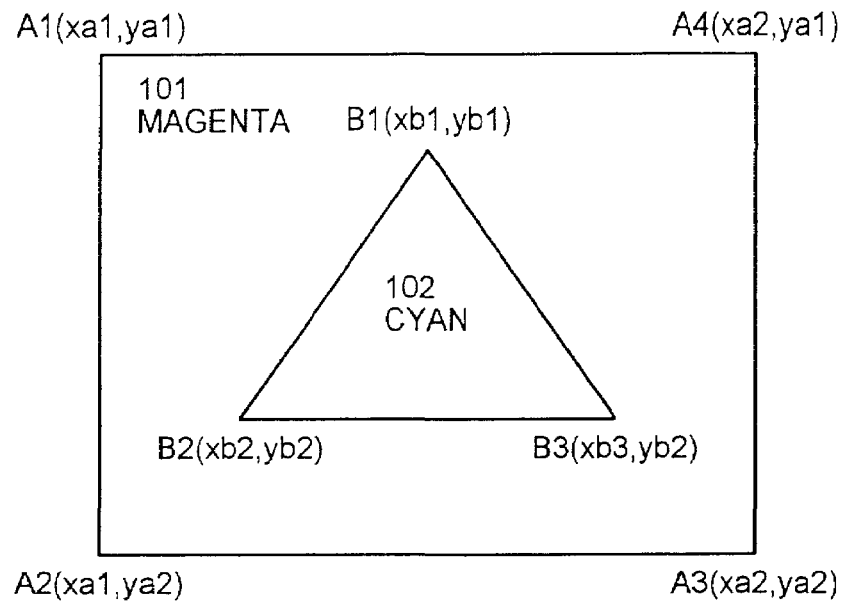
FIG. 2 is a view showing an example of a component constituting an image.

FIG. 2 is a view showing an example of a component constituting an image.

An image shown in FIG. 2 consists of a rectangular component to which magenta is applied, and a triangular component to which cyan is applied. The rectangular component is the "lower" side, and the triangular component is the "upper" side. Accordingly, first, the rectangular component is derived, and then the triangular component is derived. A component number for identifying a component is applied to each of the components. Here, the component number "101" is applied to the rectangular component, and the component number "102" is applied to the triangular component.

Coordinates of four vertexes A1, A2, A3 and A4, which constitute the rectangle, are expressed by (xa1, ya1), (xa1, ya2), (xa2, ya2) and (xa2, ya1), respectively. Coordinates of three vertexes B1, B2 and B3, which constitute the triangle, are expressed by (xb1, ya1), (xb2, yb2) and (xb3, yb3), respectively. It is noted that an X-coordinate value is larger with farther going toward the right of FIG. 2, and an Y-coordinate value is larger with farther going downwards. Paths of the components are subjected to a segment resolution in accordance with those coordinate values (a step S02 in FIG. 1).

Figure 3:
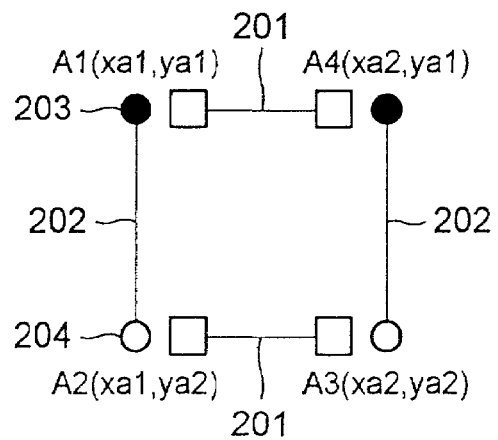
FIG. 3 is an explanatory view for a segment resolution.

FIG. 3 is an explanatory view for a segment resolution.

FIG. 3 shows a segment resolution of the rectangular component shown in FIG. 2.

The segments constituting the component are determined in accordance with the coordinate values of the vertexes including the component data. Those segments are classified into a horizontal line in which the Y-coordinate values at both the edges are equal to one another, and an upper and lower line in which the Y-coordinate values at both the edges are mutually different.

In FIG. 3, in order to distinguish the upper and lower line and the horizontal line, a white circle and a black dot are applied to both the ends of a upper and lower line 202, respectively, and four-sided figures are applied to both the ends of a horizontal line 201, respectively. With respect to a component constituted of three or more upper and lower lines 202, it is assumed that a supplement of the horizontal line and a division of the upper and lower line are suitably performed, and the component constituted of three or more upper and lower lines 202 is converted into an assembly of components each having two upper and lower lines.

With respect to the respective upper and lower line determined in accordance with such a segment resolution, an upper end point and a lower end point are extracted, and a coordinate tree, as will be described latter, is created for each component in accordance with the extracted upper end point and lower end point (a step S03).

The black dot applied to the upper and lower lines 202 shown in FIG. 3 denotes an upper end point 203, and the white circle denotes a lower end point 204. As described above, since the coordinates of four vertexes A1, A2, A3 and A4, which constitute the rectangle, are expressed by (xa1, ya1), (xa1, ya2), (xa2, ya2) and (xa2, ya1), respectively, coordinates of two upper end points 203 are expressed by (xa1, ya1) and (xa2, ya1), respectively, and coordinates of two lower end points 203 are expressed by (xa1, ya2) and (xa2, ya2), respectively.

Figure 4:
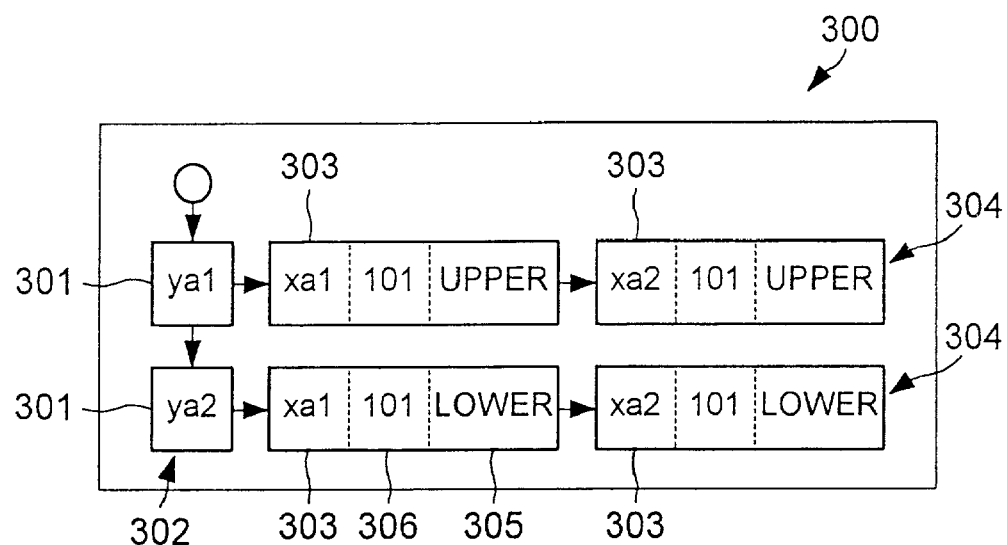
FIG. 4 is a view showing an example of a coordinate tree.

FIG. 4 is a view showing an example of a coordinate tree.

A coordinate tree 300 shown in FIG. 4 denotes the rectangular component shown in FIG. 2.

The coordinate tree 300 consists of a trunk 302 in which Y-coordinate values 301 range, and branches 304 in which X-coordinate values 303 associated with the Y-coordinate values 301 range. The Y-coordinate values 301 ranging to the trunk 302 and the X-coordinate values 303 ranging to the branches 304 are sorted in the order of arrows. Appended to each of the branches 304 are upper and lower sides data 305 for distinguishing the upper side point from the lower side point, and a component number 306 of a component represented by the coordinate tree 300. A pair of X-coordinate values 303 between the upper side points ranging to one branch 304, or a pair of X-coordinate values 303 between the lower side points ranging to one branch 304 denotes a horizontal line. And, a pair of X-coordinate value 303, to which the upper and lower sides data 305 representative of the upper side point is appended, and X-coordinate value 303 existing on a branch different from the first occurring coordinate value, to which the upper and lower sides data 305 representative of the lower side point is appended, denotes a upper and lower line.

In a similar fashion to the procedures explained referring to FIGS. 3 and 4, the triangular component shown in FIG. 2 is also subjected to a segment resolution so that a coordinate tree of the triangular component is created.

Figure 5:
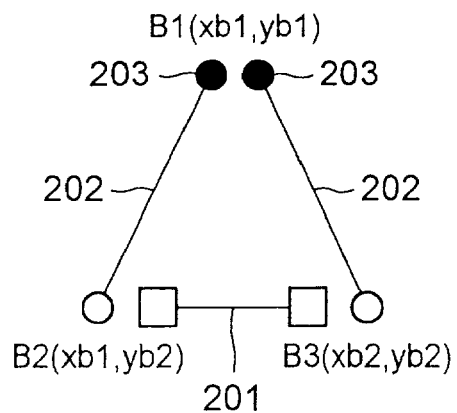
FIG. 5 is a view showing a segment resolution of a triangular component shown in FIG. 2.
Figure 6:
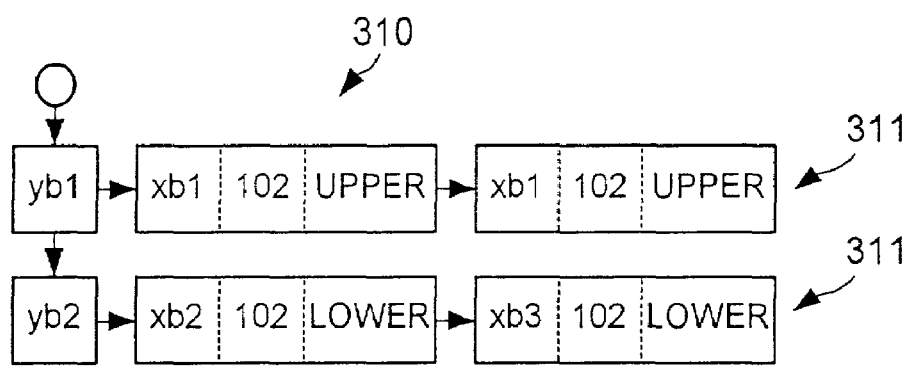
FIG. 6 is a view showing a coordinate tree of a triangular component shown in FIG. 2.

FIG. 5 is a view showing a segment resolution of a triangular component shown in FIG. 2. FIG. 6 is a view showing a coordinate tree of a triangular component shown in FIG. 2.

FIG. 5 shows a state in which the triangular component shown in FIG. 2 is subjected to a segment resolution into one horizontal line 201 and two upper and lower lines 202. Those two upper and lower lines 202 form a vertex angle of a triangle. Coordinates of the upper side points 203 of two the upper and lower lines 202 are expressed by (xb1, yb1). Thus, of the branches 311 of the coordinate tree 310 shown in FIG. 6, the branches, in which the same X-coordinate values xb1 are ranged, denote a horizontal line where the length is "0".

When the step S01 to the step 03 in FIG. 1 is repeated so that coordinate trees of two or more components are created, the coordinate trees are merged together (a step S04 in FIG. 1).

FIG. 7 to FIG. 14 are views each showing the procedure in which coordinate trees are merged together.

Hereinafter, there will be explained, a procedure that a coordinate tree 310 shown in FIG. 6 is merged into the coordinate tree 300 shown in FIG. 4, referring to FIG. 7 to FIG. 14.

Figure 7:
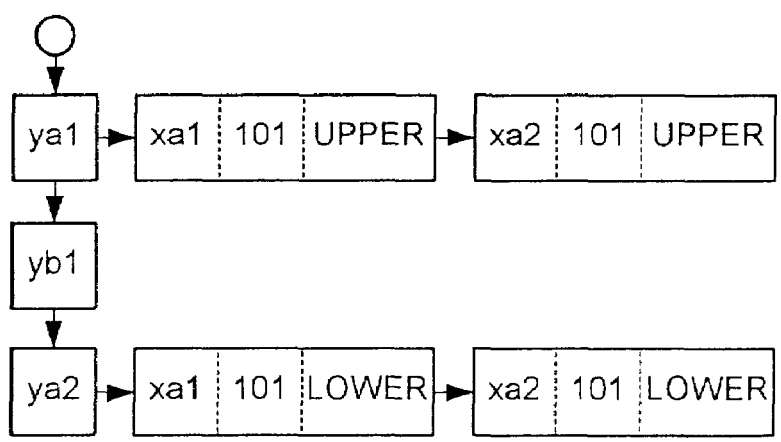
FIG. 7 is a view showing a first step of the procedure in which coordinate trees are merged together.

First, as shown in FIG. 7, Y-coordinate values shown in the trunk of the coordinate tree 310 shown in FIG. 6 are incorporated into the trunk 302 of the coordinate tree 300 shown in FIG. 4. Here, by way of an example, there is shown a procedure that the Y-coordinate value yb1 is incorporated into the trunk 302. Since the Y-coordinate value yb1 is a value between the Y-coordinate value ya1 and the Y-coordinate value ya2, the Y-coordinate value yb1 is supplemented between the Y-coordinate value ya1 and the Y-coordinate value ya2.

Figure 8:
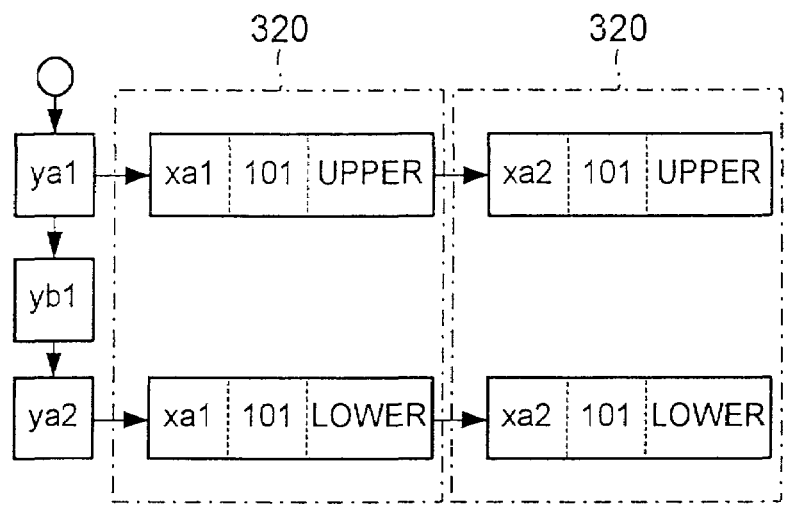
FIG. 8 is a view showing a second step of the procedure in which coordinate trees are merged together.
Figure 9:
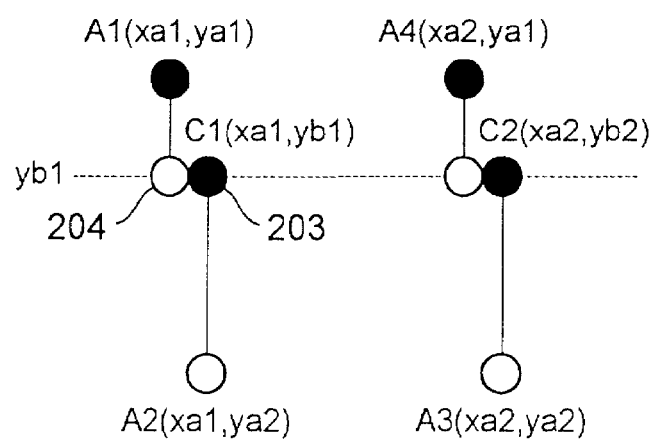
FIG. 9 is a view showing a third step of the procedure in which coordinate trees are merged together.

Next, as shown in FIG. 8, there is retrieved a pair of X-coordinate values indicative of upper and lower line exceeding the Y-coordinate value yb1. In FIG. 8, there is detected two pairs 320 of X-coordinate values each indicative of such upper and lower line. And as shown in FIG. 9, there are determined intersection points C1 and C2 of the horizontal line having the Y-coordinate value yb1 and the detected upper and lower lines. And a new set of the lower side point 204 and the upper side point 203 is provided at the same positions as the intersection points C1 and C2.

Figure 10:
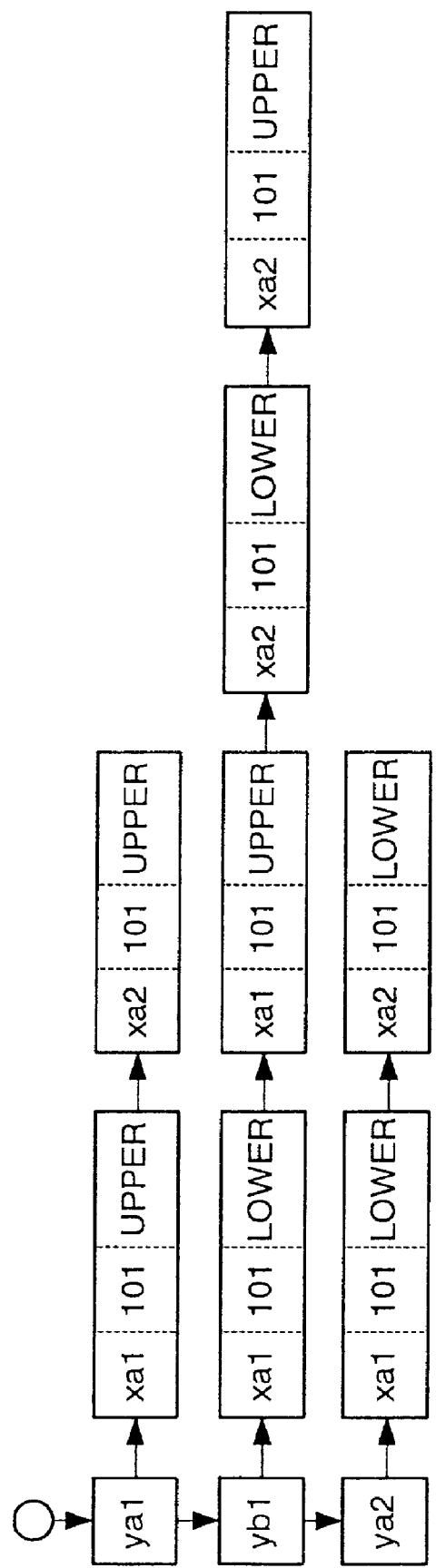
FIG. 10 is a view showing a fourth step of the procedure in which coordinate trees are merged together.

As shown in FIG. 10, four X-coordinate values xa1, xa1, xa2 and xa2 corresponding to the newly provided lower side points and the upper side points are added to the coordinate tree in form of a branch to the Y-coordinate value yb1. As a result, as mentioned above, an image is divided by the horizontal line coupling between the newly provided upper side points and the horizontal line coupling between the newly provided lower side points.

Figure 11:
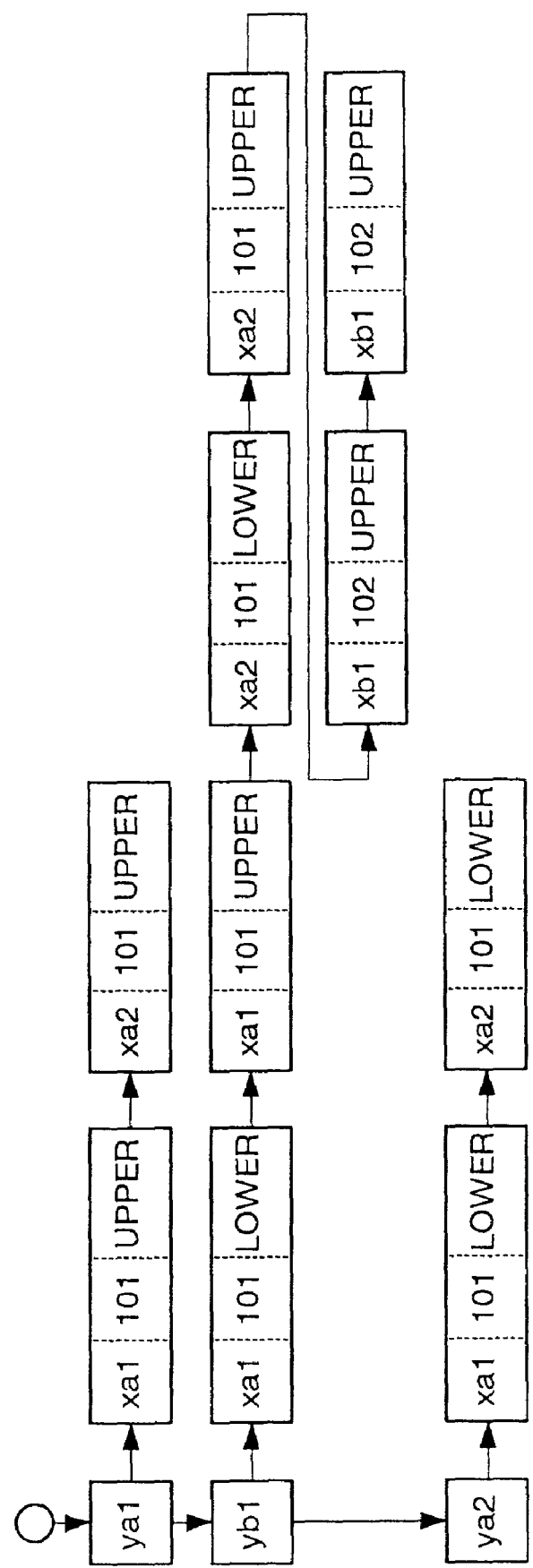
FIG. 11 is a view showing a fifth step of the procedure in which coordinate trees are merged together.

Further, as shown in FIG. 11, two X-coordinate values xb1 and xb1 corresponding to the Y-coordinate value yb1 are extracted from the coordinate tree 310 shown in FIG. 6 and are supplemented to the coordinate tree 310 in FIG. 11. But, component numbers appended to the two X-coordinate values xb1 and xb1 thus supplemented are "102", and are different from the component numbers appended to other X-coordinate values shown in FIG. 11. That is, the supplemented two X-coordinate values $xb_1$ and $xb_1$ are supplemented in form of coordinate values of vertexes constituting the component of the number "102".

Figure 12:
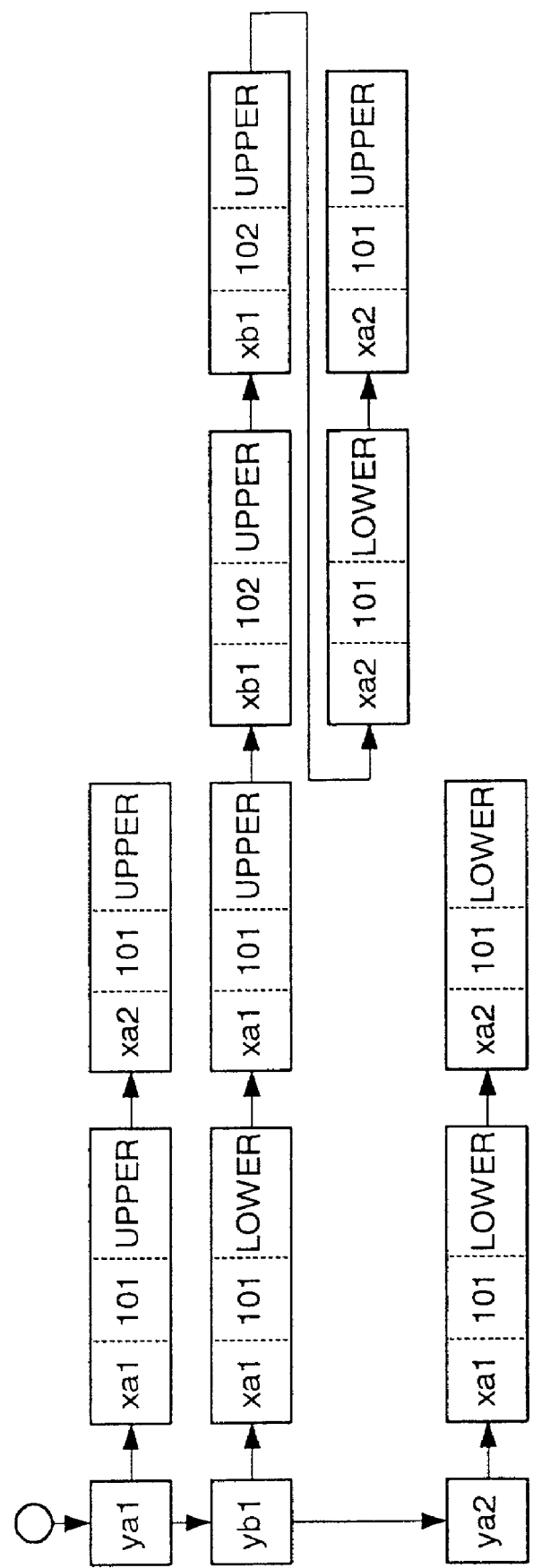
FIG. 12 is a view showing a sixth step of the procedure in which coordinate trees are merged together.
Figure 13:
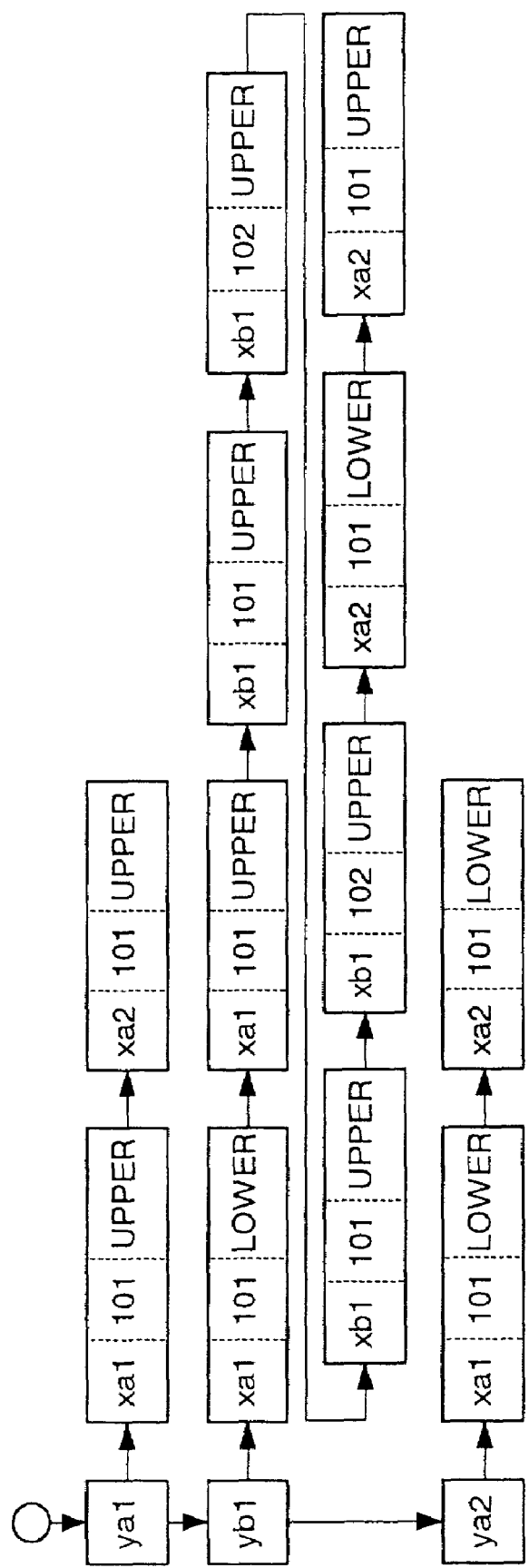
FIG. 13 is a view showing a seventh step of the procedure in which coordinate trees are merged together.

Thereafter, as shown in FIG. 12, X-coordinate values of branches to the Y-coordinate value yb1 are sorted. And as shown in FIG. 13, X-coordinate values xb1 and xb1, which are the same as the X-coordinate values xb1 and xb1 supplemented in FIG. 11, are further supplemented. The component number appended to the supplemented two X-coordinate values xb1 and xb1 are "101". Those two X-coordinate values xb1 and xb1 are supplemented to the coordinate tree in form of coordinate values constituting a frame in which a rectangular component is hollowed out by a triangular component.

Figure 14:
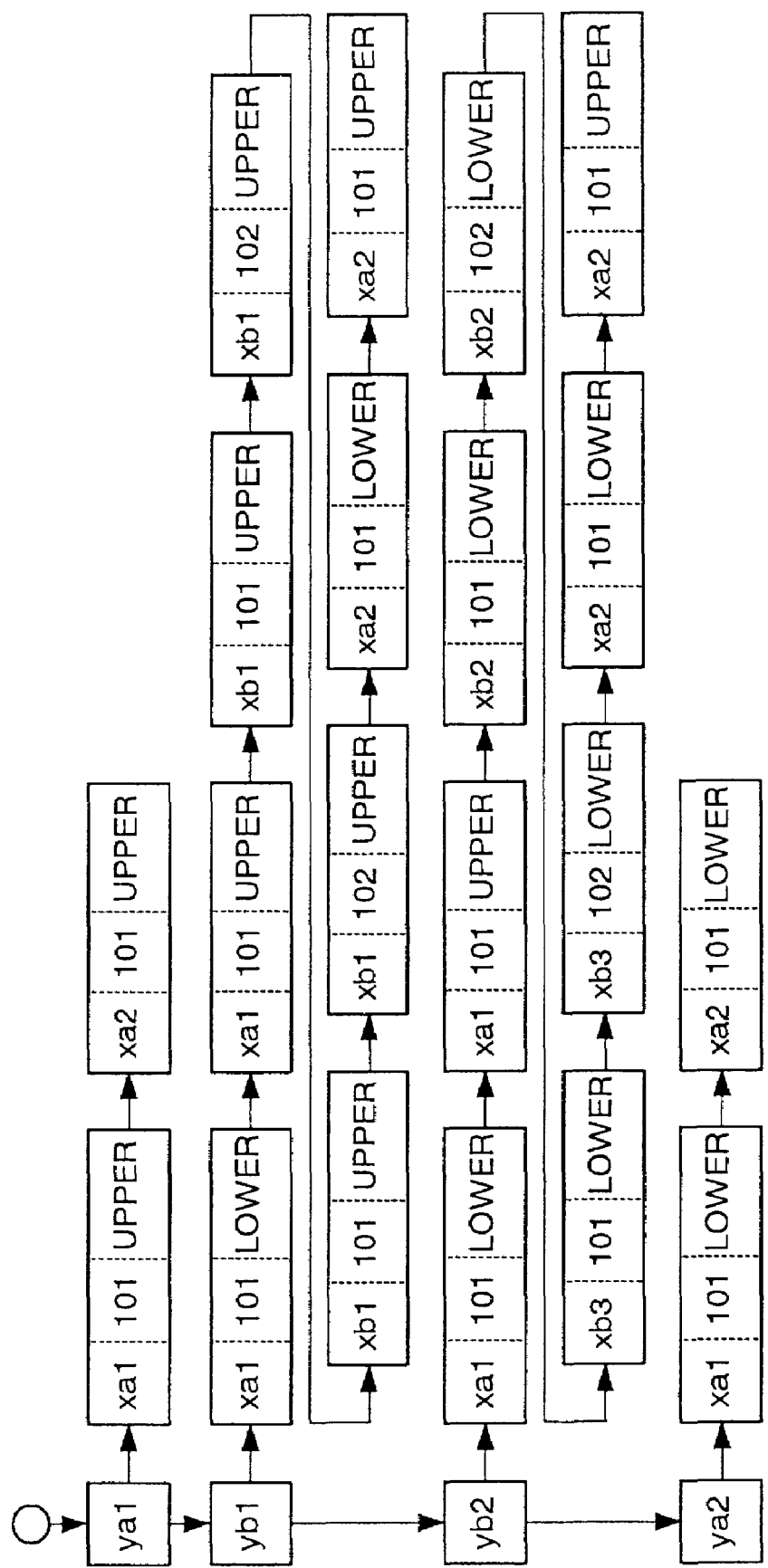
FIG. 14 is a view showing a final step of the procedure in which coordinate trees are merged together.

This procedure explained referring to FIG. 7 to FIG. 13 is executed on the Y-coordinate value yb2 shown in FIG. 6 too, and as shown in FIG. 14, merging of the coordinate trees is completed.

Incidentally, according to the above-mentioned explanation, there is no explanation as to a case where sides, which constitute each of a plurality of components constituting an image, intersect each other. In case of intersection of the sides, however, when the coordinate tree is merged, the intersection point of those sides is also computed. Those sides are divided at the intersection point and a new set of upper side point and lower side point is established. Further, a horizontal line passing through the intersection point suitably divides the image.

The creation and merging of the coordinate trees in the step S01 to the step S04 are repeated for each of the components constituting the image (a step S05 in FIG. 1). As a result, it is possible to obtain a coordinate tree in which all of the coordinate trees of the components constituting the image are merged. Thus, area data representative of an area in which an image is divided is created from the merged coordinate tree (a step S06 in FIG. 1).

Figure 15:
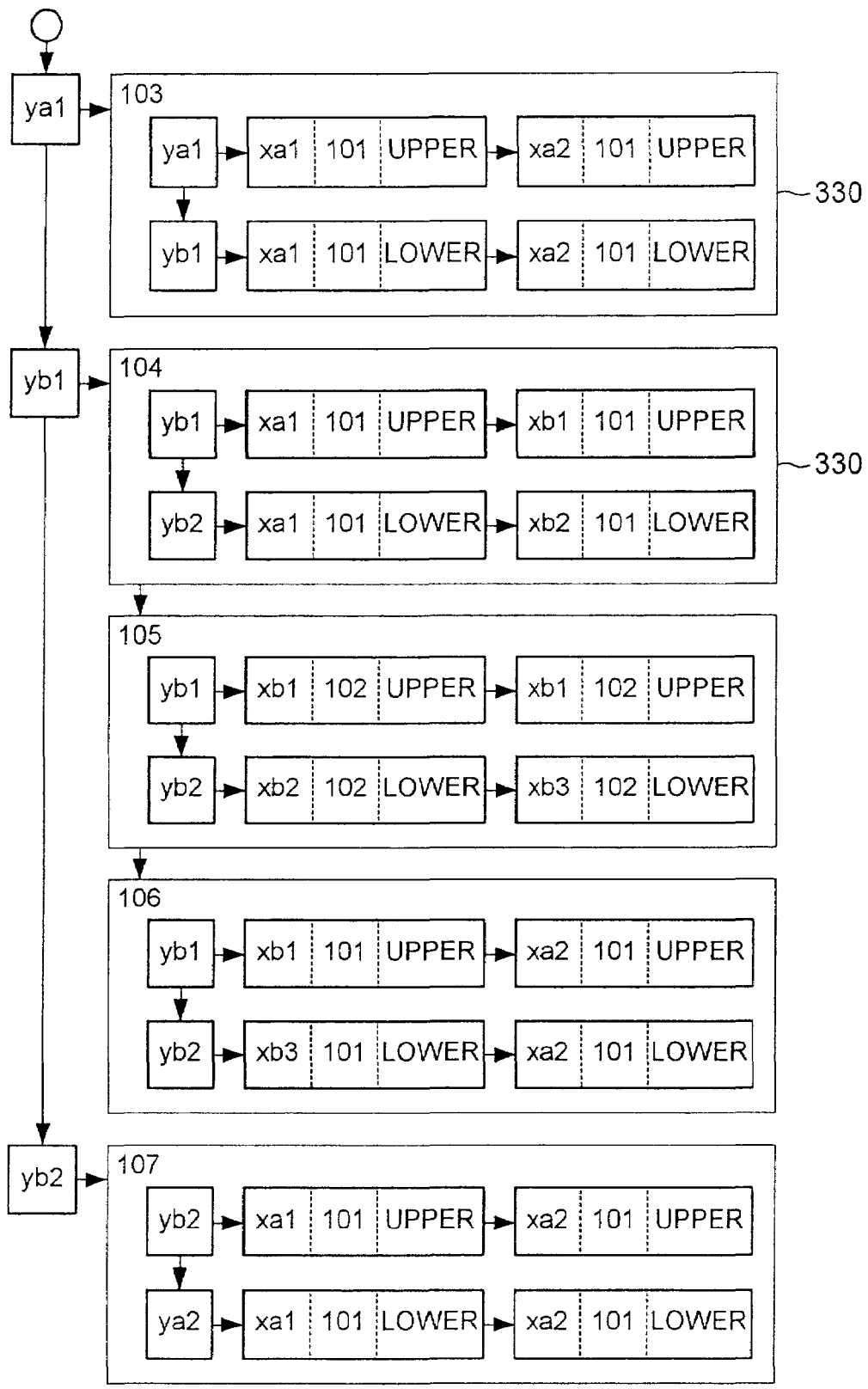
FIG. 15 is a view showing area data generated from coordinate trees.

FIG. 15 is a view showing area data generated from coordinate trees.

Area data representative of polygonal area consisting of combinations of the upper and lower side lines and the horizontal lines are sequentially extracted from the upward stream side of the coordinate trees shown in FIG. 14. Here, total five area data 330 are extracted. Extraction of those area data 330 causes the image shown in FIG. 2 to be substantially divided into five areas. Appended to the extracted area data are area numbers "103", "104", "105", "106" and "107", which are for distinguish the areas represented by the area data from one another.

Figure 16:
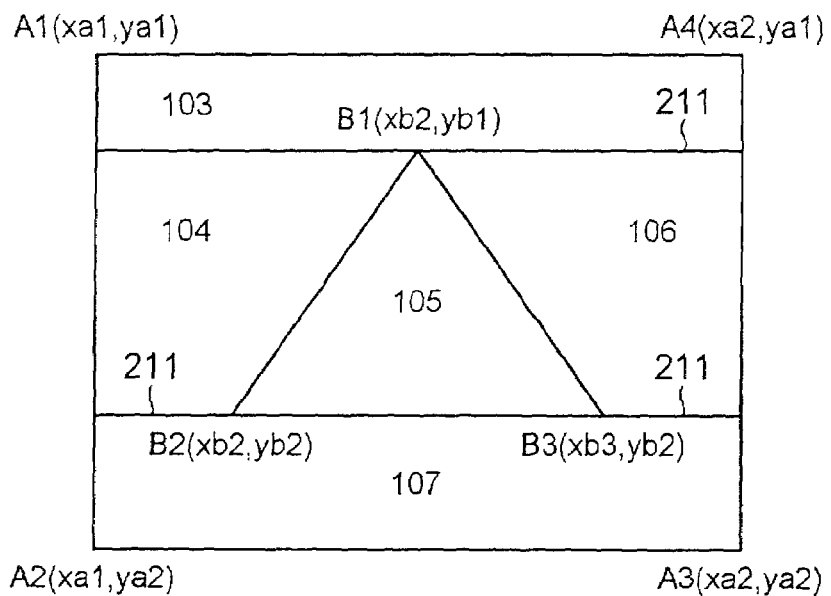
FIG. 16 is a view showing a divided image.

FIG. 16 is a view showing a divided image.

FIG. 16 shows a result that the image shown in FIG. 2 is divided into five areas such as the area numbers "103", "104", "105", "106" and "107". Horizontal lines 211 passing through vertexes B1, B2 and B3 divide the image. According to the present embodiment, all the horizontal lines passing through vertexes B1, B2 and B3 unconditionally divide the image.

Next, an area number table representative of a positional relation among the areas is created in accordance with the area data extracted from the coordinate trees and then created (a step S07).

TABLE 1

| Area Nos. | Area Nos. on upper | Area Nos. on right | Area Nos. on below |
|---|---|---|---|
| 103 | non | non | 104, 105, 106 |
| 104 | 103 | 105 | 107 |
| 105 | 103 | 106 | 107 |
| 106 | 103 | non | 107 |
| 107 | 104, 105, 106 | non | non |

Table 1 shows an area number table created in accordance with the five area data 330 shown in FIG. 15. An area number column of the left end of the area number table shows numbers of areas represented by the area data 330 shown in FIG. 15. Three columns of right side of the area number table show numbers of areas adjacent upward, rightward and downward with respect to the areas represented by the numbers shown in the area number column, respectively. Here, the areas adjacent upward and downward are areas adjacent upward and downward with respect to the horizontal line, respectively. The area adjacent rightward is an area adjacent rightward with respect to the upper and lower line. With respect to the area of the number "105", it is processed assuming that the horizontal line of the length "0" interposed between two upper side points exists at the position of the vertex against the base of the triangle.

Area information represented by the respective stage of the area number table thus created denotes a positional relation between a certain area and a peripheral area of the certain area. The area information is derived from the area number table one by one for a stage of area information (a step S08 in FIG. 1), and it is determined as to whether there is a plurality of areas adjacent upward or downward with respect to a certain area (a step S09 in FIG. 1). For example, according to the area number table shown in Table 1, three areas exist downward the area of the number "103", and three areas exist upward the area of the number "107".

Thus, in the event that there is a plurality of areas adjacent upward or downward, the area is further divided by a vertical line extending in a vertical direction (a step S10 in FIG. 1). In the area number table shown in Table 1, the area of the number "103" and the area of the number "107" are an object of the further division, and as will be described, they are divided by the vertical line.

The above-mentioned processing of the step S08 and the step S09 is repeated on the whole area information shown in the area number table (a step S11 in FIG. 1).

Figure 17:
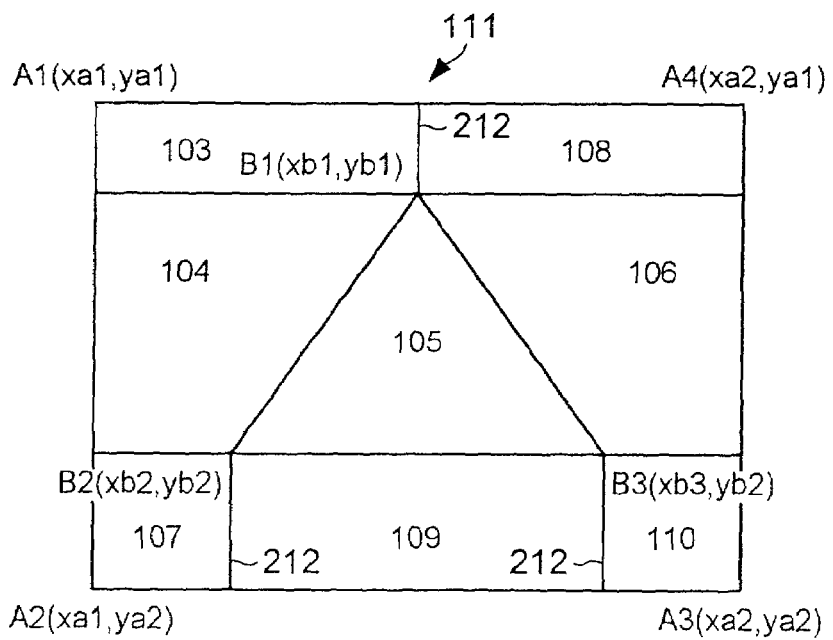
FIG. 17 is a view showing an image in which an area is divided.

FIG. 17 is a view showing an image in which an area is divided.

The area of the number "103" shown in FIG. 16 is divided into three areas by a vertical line 212 passing through the vertex B1. Appended to those three areas are area numbers "103", "108" and "111". It is noted that the area of the number "111" is "0" in area. The area of the number "107" shown in FIG. 16 is divided into three areas by vertical lines 212 passing through the vertexes B2 and B3. Appended to those three areas are area numbers "107", "109" and "110". According to the present embodiment, of the vertical lines passing through the vertexes, the necessary minimum of vertical line is selected and is used for a division.

After such a division of the areas is performed, the area number table is remade.

TABLE 2

| Area Nos. | Area Nos. on upper | Area Nos. on right | Area Nos. on below |
|---|---|---|---|
| 103 | Non | 111 | 104 |
| 104 | 103 | 105 | 107 |
| 105 | 111 | 106 | 109 |
| 106 | 108 | non | 110 |
| 107 | 104 | 109 | non |
| 108 | non | non | 106 |
| 109 | 105 | 110 | non |
| 110 | 106 | non | non |
| 111 | non | 108 | 105 |

Table 2 shows one in which the area numbers table shown in Table 1 is remade after the further division of the areas. As a result of the further division of the areas, the association between the areas mutually adjacent in the upper and lower direction is given by a one-to-one correspondence.

Color information representative of colors of areas represented by the area numbers shown in the area number table thus remade is obtained in accordance with the component data and is supplemented to the area number table a step S12 in FIG. 1).

TABLE 3

| Area Nos. | Colors | Area Nos. on upper | Colors | Area Nos. on right | Colors |
|---|---|---|---|---|---|
| 103 | Magenta | non | | 111 | Magenta |
| 104 | Magenta | 103 | Magenta | 105 | Cyan |
| 105 | Cyan | 111 | Magenta | 106 | Magenta |
| 106 | Magenta | 108 | Magenta | Non | |
| 107 | Magenta | 104 | Magenta | 109 | Magenta |
| 108 | Magenta | non | | non | |

TABLE 3-continued

| Area Nos. | Colors | Area Nos. on upper | Colors | Area Nos. on right | Colors |
|---|---|---|---|---|---|
| 109 | Magenta | 105 | Cyan | 110 | Magenta |
| 110 | Magenta | 106 | Magenta | non | |
| 111 | Magenta | non | | 108 | Magenta |

Table 3 shows an area number table in which the color information representative of colors of areas represented by the area numbers shown in Table 2 is supplemented. Color information representative of cyan is combined with the area number "105", and color information representative of magenta is combined with other than the area number "105".

A trapping candidate to be subjected to trapping is determined in accordance with the area number table to which the above-mentioned color information is supplemented, and a predetermined trapping condition, in form of an area pair (a step S13 in FIG. 1). For each of the stages in Table 3, it is checked as to whether a pair of an area represented by the area number shown in the area number column and an area adjacent upward the area (first occurrence) satisfies the trapping condition. Further it is also checked as to whether a pair of an area represented by the area number shown in the area number column and an area adjacent rightward the area (first occurrence) satisfies the trapping condition. According to the present embodiment, as colors of areas, only two colors of magenta and cyan are supposed. Accordingly, there is used such a simple trapping condition that the trapping is performed when colors of the adjacent two areas are different from each other.

TABLE 4

| Object areas | Colors | Trapping Object | Colors |
|---|---|---|---|
| 104 | Magenta | 105 | Cyan |
| 105 | Cyan | 106 | Magenta |
| 105 | Cyan | 111 | Magenta |
| 109 | Magenta | 105 | Cyan |

Table 4 shows area pairs satisfying the above-mentioned simple trapping condition.

As a trapping condition other than the above-mentioned simple trapping condition, there are considered, for example, such a condition that a trapping is performed when a color difference between the mutually adjacent two areas is larger than a predetermined color difference, and such a condition that a trapping is performed when a difference in chromaticity between those two areas is larger than a predetermined value.

When the area pair as shown in Table 4 is determined, the trapping area is created in accordance with the following procedure.

First, a pair of areas as a trapping candidate is obtained (a step S14 in FIG. 1). Then, a band-shaped trapping area, which extends along the boundary of two areas constituting the area pair, is created (a step S15 in FIG. 1). As a position at which a trapping area is created, there are considered three ways of one side, another side and both sides of the boundary line of two areas adjacent to each other. Here, a trapping area is created in a condition that the trapping area is created always at one side of the magenta side. As a technique of creating a trapping area, here, there is adopted such a technique that a segment extending in parallel to the boundary line is determined, and a band-shaped area interposed between the segment and the boundary line is created in form of a trapping area.

As a color applied to the trapping area thus generated, there are considered the same color as a color of one of the two areas and neutral tints of colors of the areas. Here, the neutral tints of cyan and magenta are applied to the trapping area.

Generally, there is generated a trapping area according to the color difference between two areas mutually adjacent. For example, in the event that the color difference is large, there is created a trapping area in which an area light in color makes inroads into an area dark in color. In the event that the color difference is small, there is created a trapping area in which both the areas make inroads into one another.

Figure 18:
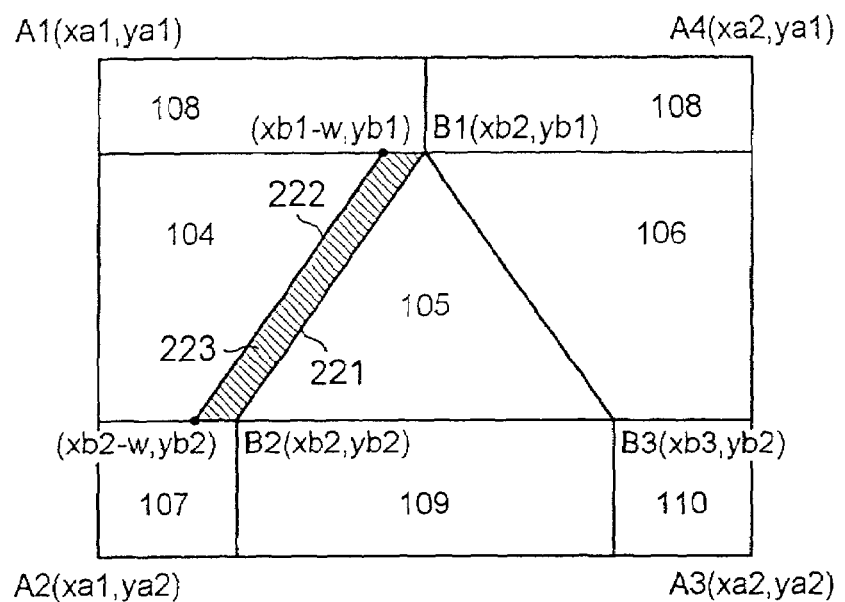
FIG. 18 is a view showing a created trapping area.

FIG. 18 is a view showing a created trapping area.

According to the present embodiment, a segment extending in parallel to the boundary line is determined assuming that the boundary line is translated in parallel to any direction of four directions of the upper and lower sides and the right and left sides by a predetermined amount w. In FIG. 18, a pair of an area of a number "104" and an area of a number "105" is a trapping candidate. A boundary line 221 of those areas is subjected to a parallel translation horizontally in the left direction of the figure, so that a segment 222 having two coordinate points (xb1-w, yb1), (xb2-w, yb2) as its both ends is determined. And an area hatched, which is interposed between the segment 222 and the boundary line 221, is created in form of a trapping area 223.

The above-mentioned step S14 and step S15 are repeated until all of the area pairs as the trapping candidates as shown in the Table 4 are obtained and trapping areas for all the area pairs are created (a step S16 in FIG. 1: Yes).

Figure 19:
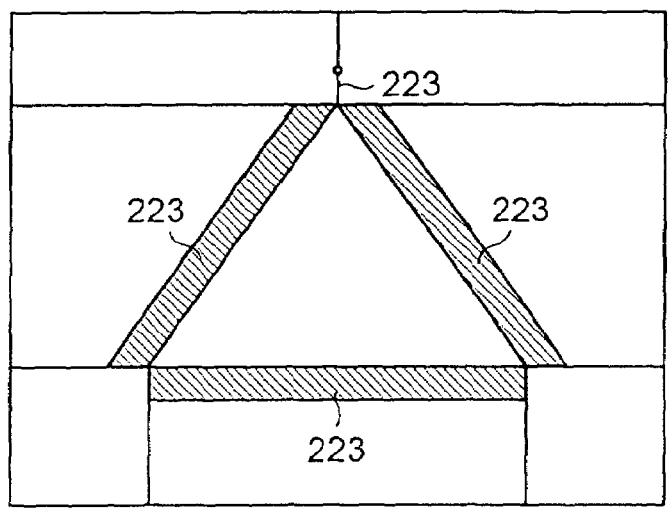
FIG. 19 is a view showing a state that trapping areas are created on all the area pairs shown in Table 4.

FIG. 19 is a view showing a state that trapping areas are created on all the area pairs shown in Table 4.

There are created three band-shaped trapping areas 223 in such a manner that the areas 223 encircle a triangular area of the center. Further, there is also created a trapping area 223 of an area "0" upward the vertex opposing to the bottom of the triangle.

The trapping areas thus created are combined so that an integrated trapping area is created (a step S17 in FIG. 1)

FIG. 20 to FIG. 23 is views showing the procedure in which an integrated trapping area is created in the step S17.

Hereinafter, there will be explained the procedure in which an integrated trapping area is created, referring to the figures.

Figure 20:
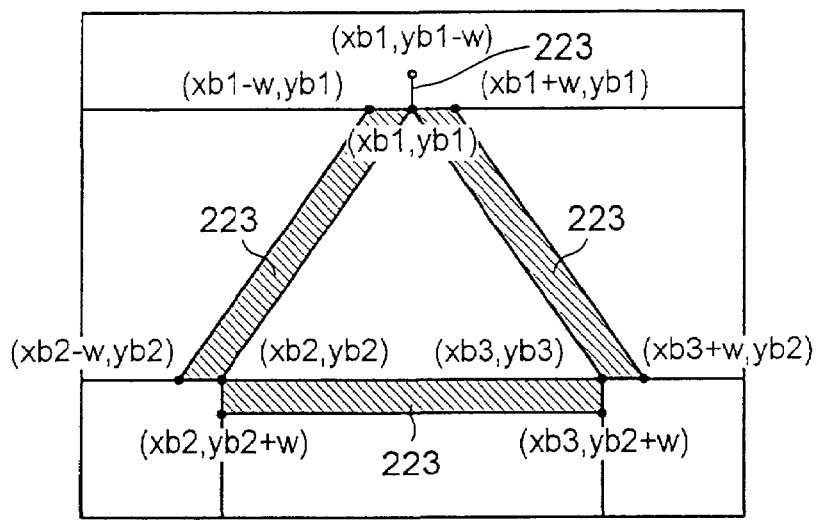
FIG. 20 is a view showing a first step of the procedure in which an integrated trapping area is created.
Figure 21:
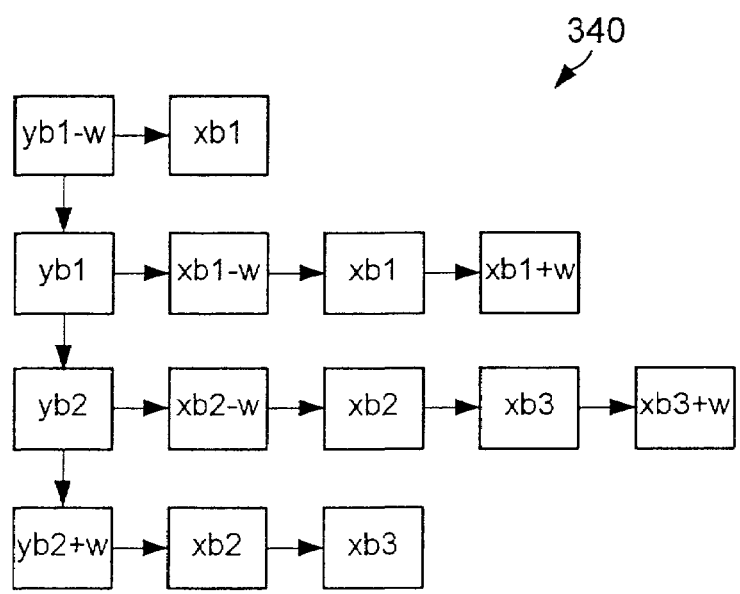
FIG. 21 is a view showing a second step of the procedure in which an integrated trapping area is created.
Figure 22:
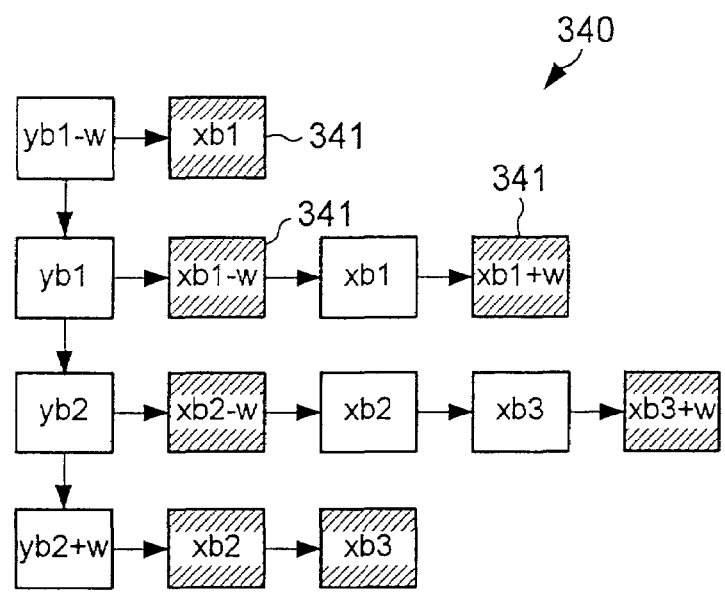
FIG. 22 is a view showing a third step of the procedure in which an integrated trapping area is created.

FIG. 20 shows vertexes of a polygonal, which constitute the trapping areas 223 created in the step S14 to S16, together with coordinate values of the vertexes. A coordinate tree 340 shown in FIG. 21 is created in accordance with the coordinate values of the vertexes. As shown in FIG. 22 with hatching, coordinate values 341 of external points constituting an external form of the integrated trapping area are extracted from the coordinate tree 340.

Figure 23:
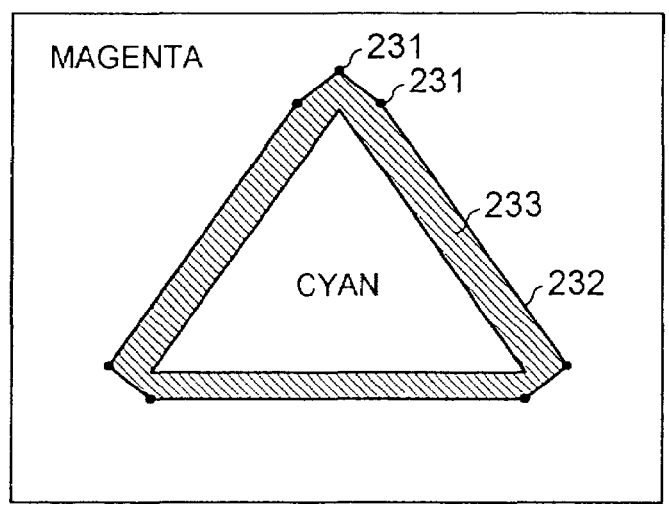
FIG. 23 is a view showing a final step of the procedure in which an integrated trapping area is created.

Thereafter, as shown in FIG. 23, an external form of line 232 is created in such a manner that the external points 231 represented by the extracted coordinate values are sequentially coupled, and an integrated trapping area 233, which is interposed between the external form of line 232 and the above-mentioned boundary line, is created as shown with hatching.

According to the above-mentioned trapping area creating method, the number of divisions of an image is not many and an amount of arithmetic operation is also not much. Thus, it is possible to create the trapping areas at high speed.

The number of divisions of an image and a divisional condition for determining as to whether an image is to be divided (for example, a condition for determining as to whether a division by the vertical line is to be performed) are not restricted to the present embodiment and can be suitably altered. Even if the number of divisions is increased as a result that the divisional condition, which is different from that in the present embodiment, is adopted, the total number of the divisions is restricted to the number sufficiently not so many, and thus it is possible to create the trapping area at high speed.

Further, according to the present embodiment as mentioned above, as an example of the technique of dividing an image, there is shown the technique of the division by merging of coordinate trees. However, in the division step of the present invention, it is acceptable that an image is divided in accordance with a technique other than the technique shown in the present embodiment as mentioned above.

As to a direction in which an area adjacent to a certain area is checked in order to determine a trapping candidate, there are considered two ways of down and left, and two ways of up and left, other than two ways of up and right as mentioned above. Further, as to a divisional direction of an image, there are considered a 45-degree direction and a 135-degree direction. In the event that such a divisional direction is adopted, as a direction in which the adjacent area is checked, there are considered two ways of upper right and lower right.

Finally, there will be described an embodiment of a trapping area creating apparatus of the present invention and an embodiment of a trapping area creating program storage medium of the preset invention.

Figure 24:
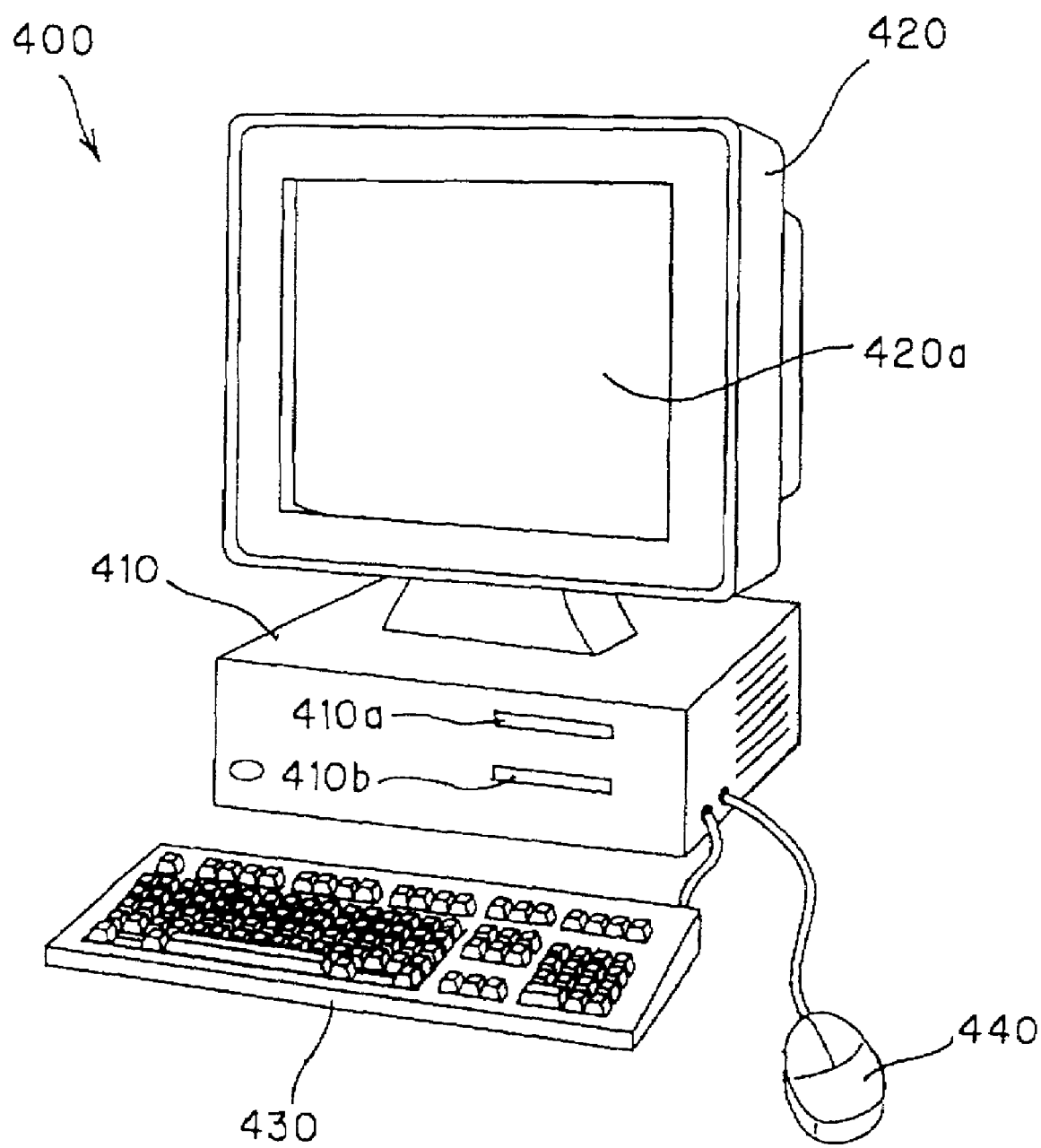
FIG. 24 is a perspective view of a trapping area creating apparatus according to an embodiment of the present invention.
Figure 25:
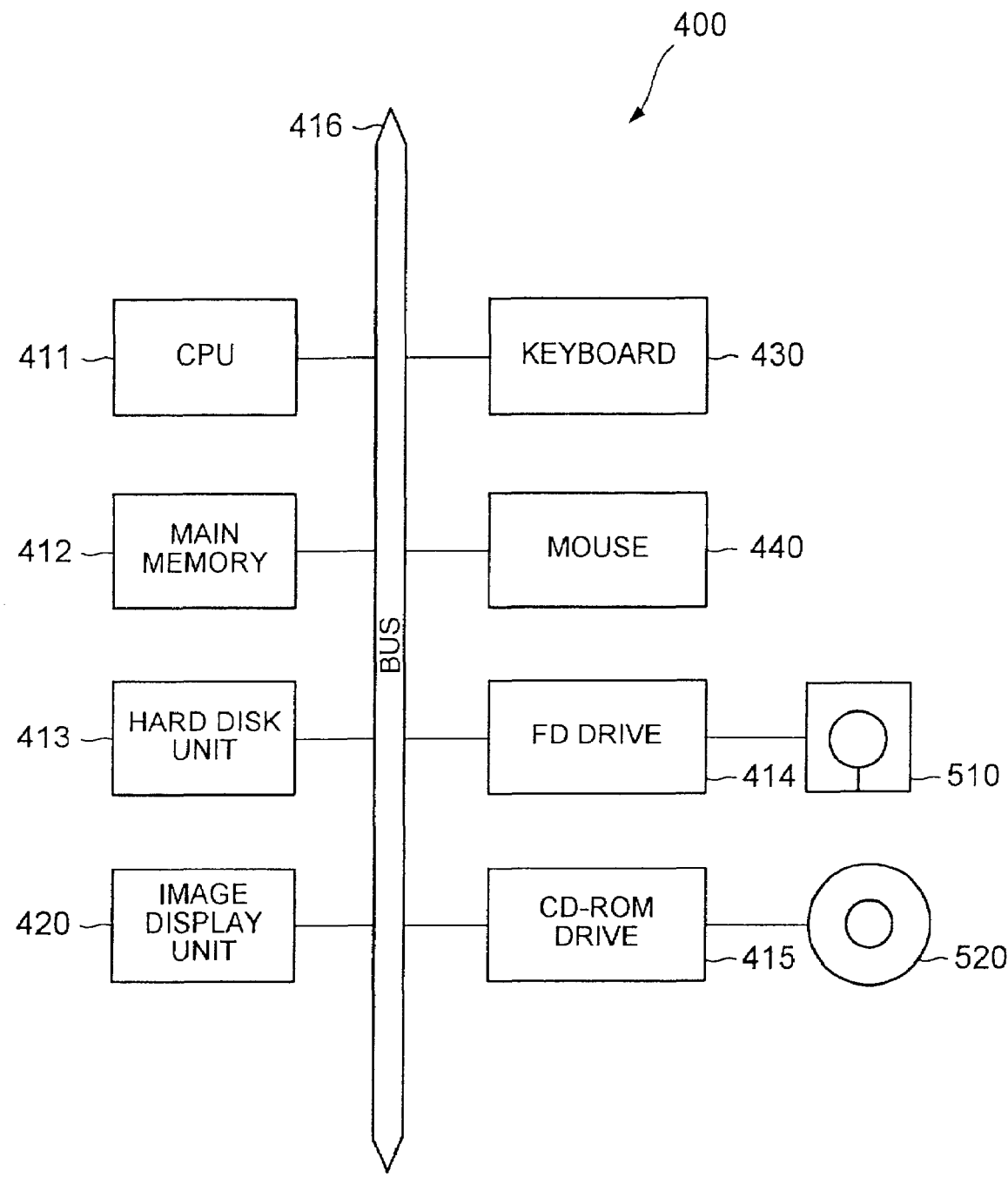
FIG. 25 is a hardware structural view of a trapping area creating apparatus according to an embodiment of the present invention.

FIG. 24 is a perspective view of a trapping area creating apparatus according to an embodiment of the present invention. FIG. 25 is a hardware structural view of a trapping area creating apparatus according to an embodiment of the present invention.

A trapping area creating apparatus 400 is constituted of a computer.

The trapping area creating apparatus 400 comprises, on an external appearance, a main frame unit 410, an image display unit 420 for displaying an image on a display screen 420a in accordance with an instruction from the main frame unit 410, a keyboard 430 for inputting various sorts of information to the main frame unit 410 in accordance with a key operation, and a mouse 440 for inputting an instruction according to, for example, an icon and the like, through designation of an optional position on the display screen 420a, the icon and the like being displayed on the position on the display screen 420a. The main frame unit 410 has a floppy disk mounting slot 410a for mounting a floppy disk, and a CD-ROM mounting slot 410b for mounting a CD-ROM.

The main frame unit 410 comprises, as shown in FIG. 25, a CPU 411 for executing a various types of program, a main memory 412 in which a program stored in a hard disk unit 413 is read out and developed for execution by the CPU 411, the hard disk unit 413 for saving various types of programs and data, an FD drive 414 for accessing a floppy disk 510 mounted thereon, and a CD-ROM drive 415 for accessing a CD-ROM 520 mounted thereon. These various types of elements are connected via a bus 416 to the image display unit 420, the keyboard 430 and the mouse 440.

The CD-ROM 520 stores therein a trapping area creating program for causing the computer to operate as a trapping area producing apparatus. The CD-ROM 520 is mounted on the CD-ROM drive 415 so that the trapping area creating program, which is stored in the CD-ROM 520, is up-loaded on the computer and is stored in the hard disk unit 413. The trapping area creating program thus up-loaded is developed on the main memory 412 and is executed in the CPU 411.

When the CD-ROM 520 stores an embodiment of a trapping area creating program of the present invention, the CD-ROM 520 corresponds to an embodiment of a trapping area creating program storage medium of the present invention. When the trapping area creating program is up-loaded and is stored in the hard disk unit 413, the hard disk unit 413, which stores therein the trapping area creating program, also corresponds to an embodiment of a trapping area creating program storage medium of the present invention. Further, when the trapping area creating program is down-loaded on the floppy disk 510, the floppy disk 510, which stores therein the trapping area creating program, also corresponds to an embodiment of a trapping area creating program storage medium of the present invention.

When an embodiment of a trapping area creating program of the present invention is up-loaded and executed as mentioned above, the trapping area creating apparatus 400, which operates as an embodiment of a trapping area creating apparatus of the present invention, is implemented. Here, an operation of the trapping area creating apparatus 400 is an operation that the above-mentioned trapping area creating method is executed.

Figure 26:
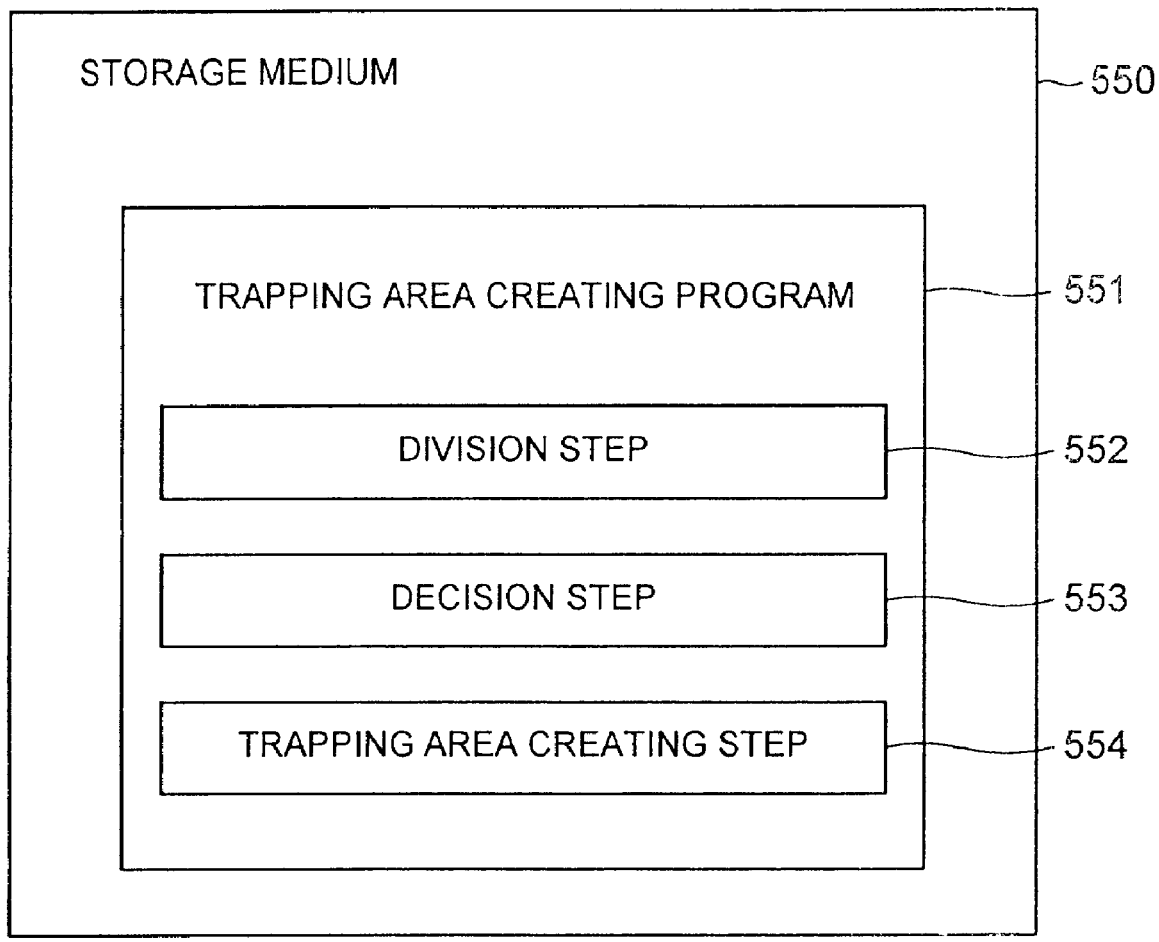
FIG. 26 is a view showing an embodiment of a trapping area creating program and a trapping area creating program storage medium of the present invention.

FIG. 26 is a view showing an embodiment of a trapping area creating program and a trapping area creating program storage medium of the present invention.

A storage medium 550 shown in FIG. 26 represents the floppy disk 510, the CD-ROM 520 and the hard disk unit 413 as shown in FIG. 25. The storage medium 550 stores therein a trapping area creating program 551 including a division step 552, a decision step 553 and a trapping area creating step 554.

The division step 552 causes the computer to execute the operation shown in the step S01 to the step S11 in FIG. 1.

The decision step 553 causes the computer to execute the operation shown in the step S13 in FIG. 1.

The trapping area creating step 554 causes the computer to execute the operation shown in the step S14 to the step S17 in FIG. 1.

When the trapping area creating program 551 is up-loaded on the computer and is executed, the computer can create a trapping area at high speed in accordance with the above-mentioned trapping area creating method.

As mentioned above, according to the present invention, it is possible to create a trapping area at high speed.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A trapping area creating method comprising:
dividing an image, represented by a combination of polygons to which colors are applied, into a plurality of image areas by at least one straight line passing through at least one vertex of the polygons, wherein an image area is designated by said at least one straight line and the boundaries of a polygon divided by said at least one straight line;
determining if trapping should be applied to each pair of image areas adjacent to one another in at least one direction of two predetermined directions; and
creating a band-shaped trapping area extending along a boundary of two image areas comprising a pair of image areas determined as being suitable for trapping.

2. A trapping area creating method according to claim 1, wherein said dividing the image uses straight lines extending in same directions as said two predetermined directions passing through the vertexes of the polygon, and sides of the polygon.

3. A trapping area creating method according to claim 1, wherein said determination uses, as said two predetermined directions, an upper and lower direction and a right and left direction of the image.

4. A trapping area creating method according to claim 1, wherein said determination is based on a difference between colors of two image areas constituting said pair of image areas.

5. A trapping area creating method according to claim 1, wherein creation of said trapping area creates, as said trapping area, an area interposed between a line constituting said boundary and a line obtained when said line (first occurring) is subjected to a parallel translation.

6. A trapping area creating apparatus for creating a trapping area in accordance with a trapping area creating method, said method comprising:
dividing an image represented by a combination of polygons to which colors are applied, into a plurality of image areas by at least one straight line passing through at least one vertex of the polygons, wherein an image area is designated by said at least one straight line and the boundaries of a polygon divided by said at least one straight line;
determining if trapping should be applied to each pair of image areas adjacent to one another in at least one direction of two predetermined directions; and
creating a band-shaped trapping area extending along a boundary of two image areas comprising a pair of image areas determined as being suitable for trapping.

7. A trapping area creating program storage medium storing a trapping area creating program, which causes a computer to execute a trapping area creating method, said method comprising:
dividing an image, represented by a combination of polygons to which colors are applied, into a plurality of image areas by at least one straight line passing through at least one vertex of the polygons, wherein an image area is designated by said at least one straight line and the boundaries of a polygon divided by said at least one straight line;
determining if trapping should be applied to each pair of image areas adjacent to one another in at least one direction of two predetermined directions; and
creating a band-shaped trapping area extending along a boundary of two image areas comprising a pair of image areas determined as being suitable for trapping, when said trapping area creating program is incorporated into said computer.

* * * * *